(12) United States Patent
Kawada et al.

(10) Patent No.: US 7,876,907 B2
(45) Date of Patent: Jan. 25, 2011

(54) APPARATUS FOR FAULT DETECTION FOR PARALLELLY TRANSMITTED AUDIO SIGNALS AND APPARATUS FOR DELAY DIFFERENCE DETECTION AND ADJUSTMENT FOR PARALLELLY TRANSMITTED AUDIO SIGNALS

(75) Inventors: Ryoichi Kawada, Saitama (JP); Atsushi Koike, Saitama (JP); Masahiro Wada, Saitama (JP); Shuichi Matsumoto, Saitama (JP)

(73) Assignee: KDDI Corporation, Tokyo (JP)

( * ) Notice: Subject to any disclaimer, the term of this patent is extended or adjusted under 35 U.S.C. 154(b) by 330 days.

(21) Appl. No.: 12/285,272

(22) Filed: Oct. 1, 2008

(65) Prior Publication Data

US 2009/0052679 A1 Feb. 26, 2009

Related U.S. Application Data

(62) Division of application No. 10/957,574, filed on Oct. 5, 2004, now Pat. No. 7,738,664.

(30) Foreign Application Priority Data

| Oct. 7, 2003 | (JP) | ............................. 2003-348224 |
| Oct. 31, 2003 | (JP) | ............................. 2003-372221 |

(51) Int. Cl.
*H04R 29/00* (2006.01)
(52) U.S. Cl. .............................. 381/56; 381/80; 381/58; 381/81; 700/94; 348/192
(58) Field of Classification Search .................. 381/77, 381/80–81, 56–58; 700/94; 348/192
See application file for complete search history.

(56) References Cited

U.S. PATENT DOCUMENTS 4,221,928 A  9/1980  Franssen et al.

(Continued)

FOREIGN PATENT DOCUMENTS

JP  2000-350238  12/2000

(Continued)

OTHER PUBLICATIONS

Japanese Office Action dated Nov. 15, 2006, issued in corresponding Japanese Patent Appln. No. 2003-372221 of Parent U.S. Appl. No. 10/957,574.

*Primary Examiner*—Devona E Faulk
*Assistant Examiner*—Disler Paul
(74) *Attorney, Agent, or Firm*—Westerman, Hattori, Daniels & Adrian, LLP

(57) ABSTRACT

Characteristic amounts in each small region of audio signals transmitted in the working system and the standby system are extracted by characteristic amount calculators 6-1, 6-2. A characteristic amount comparator 7 compares the characteristic amounts and judges occurrence of fault of a fault. Characteristic amount difference calculators 9-1, 9-2, ||D|| comparator 10, and faulty system judging unit 11 judges the system having a fault. Majority decision processor 12 and significance judging unit 13 enhance the reliability of the judgement. Delay difference of audio signals between systems is roughly detected by sub-sampling audio signals of two systems and comparing them, and then accurately detected without sub-sampling. Delay difference between audio signals is adjusted by the detected delay difference.

7 Claims, 6 Drawing Sheets

U.S. PATENT DOCUMENTS

| | | | |
|---|---|---|---|
| 6,772,392 B1 * | 8/2004 | Kawada et al. | 714/820 |
| 7,120,256 B2 * | 10/2006 | Grancea et al. | 381/55 |
| 7,260,226 B1 * | 8/2007 | Miura et al. | 381/56 |
| 2002/0052664 A1 * | 5/2002 | Kang et al. | 700/94 |

FOREIGN PATENT DOCUMENTS

| | | |
|---|---|---|
| JP | 2000-350238 A | 12/2000 |
| JP | 2001-268036 A | 9/2001 |
| JP | 2002-142131 | 5/2002 |

* cited by examiner

FAULTY REGION BY FAULT

FAULTY REGION BY FAULT (MUTE)

APPARATUS FOR FAULT DETECTION FOR PARALLELLY TRANSMITTED AUDIO SIGNALS AND APPARATUS FOR DELAY DIFFERENCE DETECTION AND ADJUSTMENT FOR PARALLELLY TRANSMITTED AUDIO SIGNALS

This application is a Divisional Application of U.S. application Ser. No. 10/957,574, filed Oct. 5, 2004; claiming priority of Japanese Appln. No. 2003-348224, filed Oct. 7, 2003 and Japanese Appln. No. 2003-372221, filed Oct. 31, 2003.

BACKGROUND OF THE INVENTION

1. Field of the Invention

The present invention relates to an apparatus for fault detection for parallelly transmitted audio signals and an apparatus for delay difference detection and adjustment for parallelly transmitted audio signals, and more particularly to an apparatus for fault detection for parallelly transmitted audio signals suitable for selective reception of fault-free audio signal at reception side selectively by transmitting a same audio signal by dividing into two channels, and an apparatus for delay difference detection and adjustment for parallelly transmitted audio signals transmitted in two channels.

2. Description of the Related Art

Hitherto, in parallel transmission of television signals for the purpose of high reliability transmission, same video/audio signals are is transmitted by dividing into two channels, and either channel is selected and received at the reception side.

FIG. 6 is z a block diagram showing such a conventional parallel transmitting apparatus. The diagram shows only about the audio signal. The upper side in the diagram is supposed to be the working system, and the lower side is the standby system, and usually the reception side manual switch 3 is usually connected to select the working system. At this time, the input audio signal is transmitted by way of encoder 1-1, working transmission line 4-1, decoder 2-1, and manual switch 3, and becomes an output audio signal.

An inspector monitors the channel status of two systems at the reception side, and when detecting an occurrence of fault of a fault in the working system, the inspector switches the manual switch 3 to the standby side. As a result, the input audio signal is transmitted by way of encoder 1-2, standby transmission line 4-2, decoder 2-2, and manual switch 3, and the audio signal is received intermittently through a normal channel.

The present applicant has previously proposed a technique of minimizing the fault time of output signal by automating switching to the normal channel in the event of fault of a fault occurring in the receiving circuit during parallel transmission in the following patent reference 1. A technique for detecting and adjusting delay difference of video signals has been proposed in the following patent reference 2.

[Patent reference 1] Japanese Patent Laid-Open (JP-A) Patent No. 2000-350238

[Patent reference 2] Japanese Patent Laid-Open (JP-A) Patent No. 2002-142131

If the inspector manually switches the switch to select a normal channel to receive video/audio signals intermittently, it takes too much time until completion of switching to normal channel capable of receiving normal audio signals, and switching without interruption is difficult, and moreover the audio signal may not be continued smoothly at the time of switching due to delay and deviation of audio signals between two channels.

The technique in patent reference 1 relates to video signals, and it is intended to switch to a normal channel by detecting fault in video signals. It is based on the condition that images of two systems entering the apparatus have been already matched in position on the screen, being free from delay deviation between the images. However, if the images are normal, the audio only may be faulty. In the technique of patent reference 1, the switching toward the normal channel side is not performed in such a case, and the audio signal remains defective.

In parallel transmission, in most cases, the two systems run different routes geometrically, and generally there is a delay difference between images of two systems. The delay difference between images of two systems can be adjusted in the technique of patent reference 2, but this is intended to detect and adjust the delay difference of video signals. When each system comprises devices for compressing and decoding television de coding television signals, video and audio signals are processed separately, and the processing timing may be deviated slightly, and if the delay difference of video signal is corrected adjusted, the delay difference of audio signal is not corrected adjusted, and a slight deviation may be left over. Therefore, in order to receive audio signals continuously and favorably regardless of switching of systems, it is also required to adjust the delay difference between audio signals in two systems.

SUMMARY OF THE INVENTION

It is hence an object of the invention to present an apparatus capable of detecting a fault in a real time even in the event of occurrence of fault of a fault in audio signal of one system in parallel transmission of audio signals, thereby enabling to receive normal audio signals continuously by instantly switching from the faulty system to a the normal system.

It is other object of the invention to present an apparatus capable of favorably detecting and adjusting favorably the delay difference between audio signals of two systems at the reception side in parallel transmission of audio signals.

In order to accomplish the object, the first feature of the present invention is that an apparatus for fault detection for parallelly transmitted audio signals, being an apparatus for fault detection for parallelly transmitted audio signals transmitted in channels of two systems, comprises characteristic amount extracting means provided in each system for extracting a characteristic amount in each small region of audio signal of each system, characteristic amount comparing means for comparing the characteristic amounts extracted by the characteristic amount extracting means between the two systems, and judging means for judging occurrence of fault of a fault in each system on the basis of the comparison result of the characteristic amount comparing means.

Also, the second feature of this invention is that an apparatus for fault detection for parallelly transmitted audio signals, being an apparatus for fault detection for parallelly transmitted audio signals transmitted in channels of two systems comprises characteristic amount extracting means provided in each system for extracting a characteristic amount in each small region of audio signal of each system, calculating means for calculating the difference between the characteristic amount in faulty region and characteristic amount in normal region in each system if fault occurs in either system and faulty region by parallelly transmitted audio signals is evident, and faulty system judging means for judging the system to be faulty at the side with of the greater difference calculated by the calculating means.

Also, third feature of the present invention is that the apparatus for fault detection for parallelly transmitted audio signals, wherein the faulty system judging means finally judges by majority decision process by using plural judging results on the basis of the difference calculated by the calculating means, and renders the judging result not significant when the difference calculated by the calculating means is smaller than a specified value.

Also, forth feature of the present invention is that the apparatus for fault detection for parallelly transmitted audio signals 2, further comprising silent and mute detecting means for detecting the audio signal in small region whether silent or not, comparing the audio signals of two systems, and detecting whether the silent state is due to a fault or not.

Also, fifth feature of the present invention is that the apparatus for fault detection for parallelly transmitted audio signals, further comprising silent and mute detecting means for detecting the audio signal in small region whether silent or not, comparing the audio signals of two systems, and detecting whether the silent state is due to a fault or not.

Also, sixth feature of the present invention is that the apparatus for fault detection for parallelly transmitted audio signals, further comprising converting means for converting the input audio signals by converting property of monotonous increase or monotonous decrease, by keeping or inverting the sign, increasing the absolute value in the relatively small area of the absolute value, or decreasing the absolute value in the relatively large area of absolute value.

Also, seventh feature of the present invention is that an apparatus for delay difference detection and adjustment for parallelly transmitted audio signals, being an apparatus for delay difference detection and adjustment between same audio signals transmitted in circuits of two systems, comprises a memory provided in each system for receiving audio data from each system, comparing means for mutually comparing outputs of the memories, control means for controlling the reading position of the memory depending on the output of the comparing means, detecting means for detecting the delay difference between audio signals of two system on the basis of the comparison result of the comparing means and the reading position of the memory, and correcting adjusting means for correcting adjusting the delay difference between audio signals of two system according to the delay difference.

Also, eighth feature of the present invention is that the apparatus for delay difference detection and adjustment for parallelly transmitted audio signals, wherein the sample values of audio signals are input into the memory as audio data, and the comparing means determines the difference of sample values.

Also, ninth feature of the present invention is that the apparatus for delay difference detection and adjustment for parallelly transmitted audio signals, wherein sub-sampling means is provided before the memory, and the sub-sample values sent out from the sub-sampling means are input into the memory as audio data.

Also, tenth feature of the present invention is that the apparatus for delay difference detection and adjustment for parallelly transmitted audio signals, wherein a route for direct input of audio data and a route for input as sub-sampled are provided at the input side of the memory, and the delay difference between audio signals of two systems is detected in two steps, these are that is a step of input of sub-sampled audio data into the memory and a successive step of input of direct data into the memory.

Also, eleventh feature of the present invention is that the apparatus for delay difference detection and adjustment for parallelly transmitted audio signals, wherein the sub-sampling means has absolute calculating and maximum selecting means, and determines the absolute value of data before sub-sampling, and further determines the maximum value in the sub-sampled object block and sends out as the sub-sample value.

Also, twelfth feature of the present invention is that the apparatus for delay difference detection and adjustment for parallelly transmitted audio signals, wherein the sub-sampling means has square calculating and maximum selecting means, and determines the square value of data before sub-sampling, and further determines the maximum value in the sub-sampled object block and sends out as the sub-sample value.

Also, thirteenth feature of the present invention is that the apparatus for a delay difference detection and adjustment for parallelly transmitted audio signals, wherein the detecting means detects the delay difference for minimizing the difference of audio data of two systems, and the control means determines the majority decision of plural times of delay difference detected by the detecting means, and controls the reading position of the memory according to the result.

According to the apparatus of this invention for fault detection for parallelly transmitted audio signals, since occurrence of fault of a fault in either one of the two systems is judged by using the characteristic amount of each small region of audio signals in each system, it is less likely to be influenced by the coding noise and stable fault detection is realized as compared with a method of directly comparing two audio samples or the like.

Since the faulty system is judged on the basis of the difference of characteristic amounts of neighboring small regions of audio signals in of each system, a stable detection is possible, regardless of quantity of transmission errors, as compared with a method of comparing the values of characteristic amounts.

By using a plurality of judging results on the basis of the difference of characteristic amounts of neighboring small regions of audio signals in of each system, the finally faulty system is finally judged by majority decision, and the reliability of determination is enhanced by considering insignificant the judging result on the basis of the difference less than the specified amount of difference of characteristic amounts.

By detecting whether the audio signal in small region is silent or not, and by detecting whether the silent state is due to fault or not by comparing audio signals in two systems, it is possible effective to prevent error in decision between silent state due to mute fault and other silent state.

If the characteristic amount of audio signal is evidently abnormal, by distinguishing and detecting it distinctively, the state can be promptly judged without having to comparing the characteristic values mutually.

Moreover, a fault can be detected correctly by using a small audio signal, by keeping or inverting the sign, increasing the absolute value in the relatively small area of absolute value, converting the audio signal in the relatively large area of the absolute value by conversion characteristic of monotonous increase or monotonous decrease of the absolute value, and executing fault detection in on the converted audio signals.

According to the apparatus of this invention for delay difference detection and adjustment for parallelly transmitted audio signals, memories are provided in each the systems, outputs of the memories are compared, and hence delay difference (deviation) between these signals by comparison of audio signals of two systems can be detected and adjusted easily. At this time, calculating the difference of sample values of audio signals of two systems, the memory reading position of the smallest difference is determined. This reading position is the position of the highest coincidence of audio signals of two systems, and the delay difference between audio signals of two systems can be detected as the difference of the reading position.

By sub-sampling the data before putting into each memory, and putting a limited number of sample values into the memory, even if the delay difference is great, the delay difference can be detected with by a limited memory capacity. After delay difference detection by sub-sampling, by detecting the delay difference without sub-sampling, the delay difference can be detected correctly without increasing the memory capacity.

As the sub-sample value, by using the maximum value in the sub-sample object block of the absolute value of each data, or the maximum value in the sub-sample object block of the square value of each data, the waveform of the original audio signal can be expressed sufficiently by a small number of samples. By mutually comparing them, a large delay difference can be detected with by a limited memory capacity.

Instead of detecting the delay difference for minimizing the difference of two systems by mutually comparing the outputs of memories, and using the detected delay difference directly in correction adjustment, by determining the majority decision of plural times of detected delay difference, and by using this result in correction adjustment as final delay difference amount, it is free from effects of compression noise superposed in on the audio signal or the drift included in the detected delay difference, so that delay difference can be detected and adjusted stably and accurately.

DETAILED DESCRIPTION OF THE PREFERRED EMBODIMENT

Figure 1:
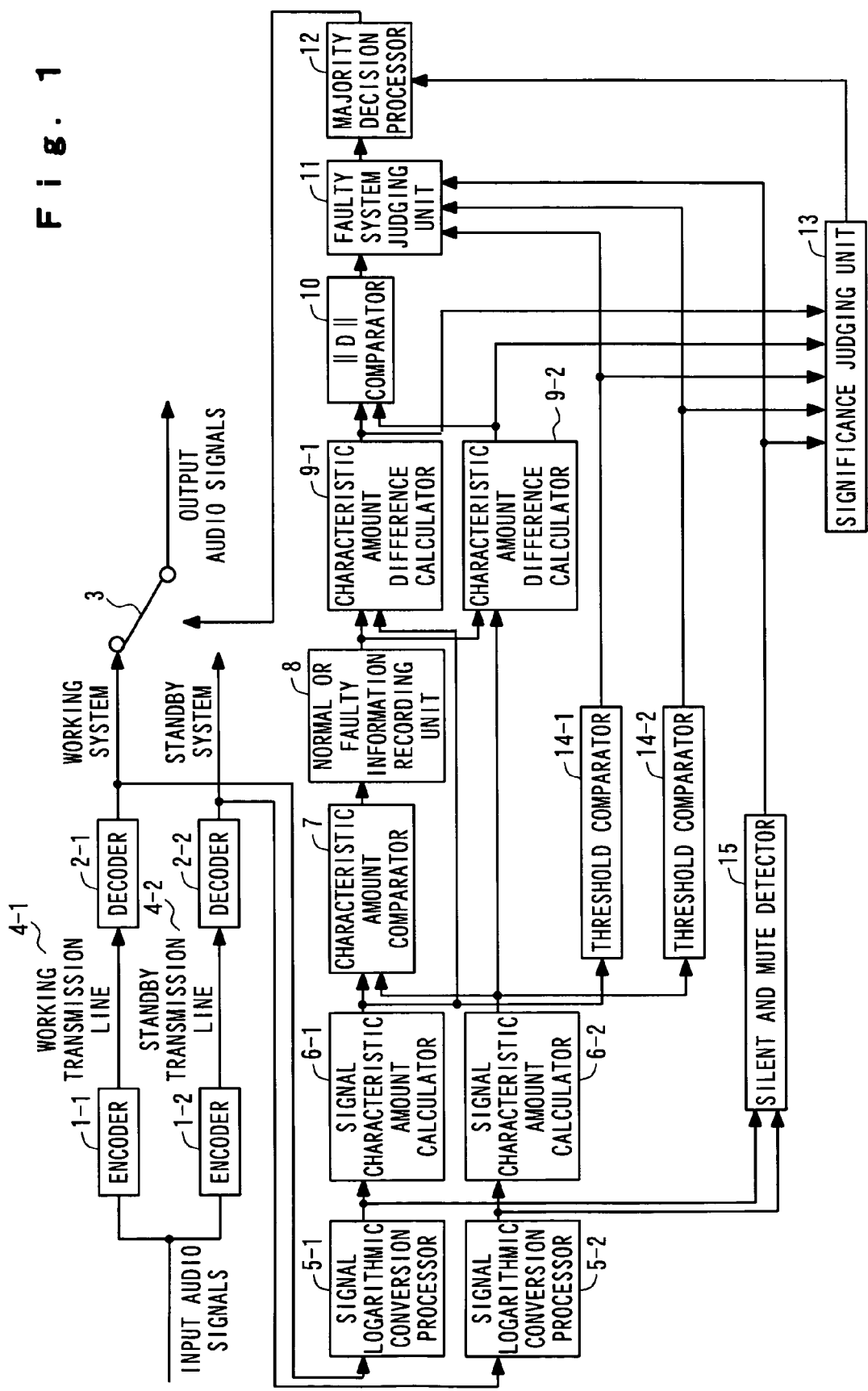
FIG. 1 is a block diagram showing a preferred embodiment of apparatus of the invention for fault detection for parallelly transmitted audio signals.

The invention is specifically described below by referring to the accompanying drawings. First, an apparatus for fault detection for parallelly transmitted audio signals is explained. FIG. 1 is a block diagram showing a preferred embodiment of apparatus of the invention for fault detection for parallelly transmitted audio signals. First, an audio signals are is distributed into two channels (systems) by a distributor (not shown). When transmitting the audio signal by digitally compressing and encoding, each system includes encoders 1-1, 1-2, and decoders 2-1, 2-2.

Supposing the upper side in the diagram to be the working system (system A), and the lower side to be the standby system (system B), usually the manual switch 3 of the reception side manual changeover switch 3 is usually connected to select the working system. At this time, the audio signal is transmitted by way of encoder 1-1, working transmission line 4-1, decoder 2-1, and manual switch 3, and becomes an output audio signal.

When a fault occurs in the working system, the manual switch 3 is switched to select the standby side according to the fault detection described blow. As a result, the audio signal is transmitted via encoder 1-2, standby transmission line 4-2, decoder 2-2, and manual switch 3.

Fault detection of audio signal is described below. First, audio signals of two systems A, B received at the reception side are put into signal logarithmic conversion processors 5-1, 5-2, respectively. The signal logarithmic conversion processors 5-1, 5-2 convert the input audio signals into logarithm while saving their signs.

The human aural characteristic has a nonlinear feature capable of sensibly distinguishing a signal sensibly even if its the signal level is small, and signal processing is preferred to be conforming to this characteristic. The signal logarithmic conversion processors 5-1, 5-2 have the conversion characteristic satisfying this requirement, and the signal change in small area of audio signals can be converted changed into a large change by this conversion, so that fault detection characteristic of small voice can be improved.

Figure 2:
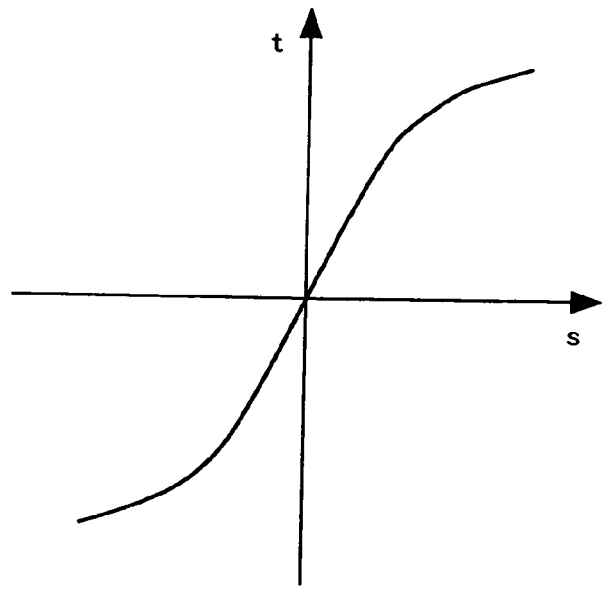
FIG. 2 is a diagram showing an example of conversion characteristic of signal logarithmic conversion processor.

FIG. 2 shows an example of conversion characteristics of signal logarithmic conversion processors 5-1, 5-2. In this conversion characteristic, the relation of input signal s and output signal t is expressed in the following formula (1).

$$t = \begin{cases} 1000\log_{10}(s+1) & \text{if } (s > 0) \\ 0 & \text{if } (s = 0) \\ -1000\log_{10}(-s+1) & \text{if } (s < 0) \end{cases} \quad (1)$$

The example in FIG. 2 shows a conversion characteristic of monotonous increase (rightward rise) of logarithmic conversion while keeping the sign, but by inverting the sign, it is also possible to use the conversion characteristic of monotonous decrease (rightward fall). In short, for the input audio signal, by keeping or inverting the sign, the conversion characteristic may be either monotonous increase or monotonous decrease for increasing the absolute value of the relatively small area of the absolute value or for decreasing the absolute value of the relatively large area of the absolute value.

Audio signals converted logarithmically in signal logarithmic conversion processors 5-1, 5-2 are put into signal characteristic amount calculators 6-1, 6-2. The signal characteristic amount calculators 6-1, 6-2 calculate and extract the characteristic amount of each small region of audio signal. As the characteristic amount, the average or mean deviation of audio signal may be used, and plural types may be extracted.

Next, the extracted characteristic amount is put into a characteristic amount comparator 7, and the characteristic amounts are compared in each small region between two systems A and B. If the difference in characteristic amount between two systems A and B is less than a specified threshold, it is judged that there is no fault in either system in this region. On the other hand, if the difference in characteristic amount between two systems A and B is more than a specified threshold, it is judged that there is a certain fault in either system in this region. On the basis of this judging result, whether normal region or faulty region can be determined judged, and normal or faulty information is recorded in normal or faulty information recording unit 8. The normal or faulty information is used when judging the faulty system as described below.

Figure 3:
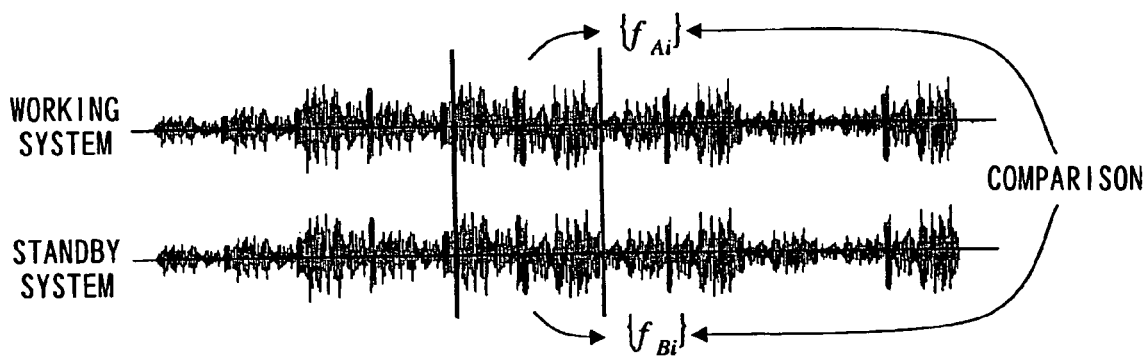
FIG. 3 is a waveform diagram for explaining the operation of signal characteristic amount calculator and characteristic amount comparator.

FIG. 3 is a waveform diagram for explaining the operation of signal characteristic amount calculators 6-1, 6-2 and characteristic amount comparator 7. First, the audio signal is divided into block (small region) units, for example, 1 block=128 samples. Next, in systems A, B, characteristic amounts in block are calculated and extracted. The characteristic amount in block of systems A, B is expressed as $\{f_{A1}Ai(p)\}$, $\{f_{B1}Bi(p)\}$ (i=1, 2, ..., N) where p is block position. Herein, N denotes the number (types) of characteristic amounts to be extracted. As the characteristic amount, as mentioned above, various values can be used such as average and standard deviation of audio signals.

When the difference of characteristic values $\{f_{A1}Ai(p)\}$, $\{f_{B1}Bi(p)\}$ between systems A and B is smaller than the specified threshold $Th_1i$ (that is, $\forall Ai \to ->|\{f_{A1}Ai(p)-\}, \{f_{B1}Bi(p)\}| \leq <= Th_1i$), it is judged that no fault has occurred in any system in this interval, and if the difference is more than the specified threshold $Th_1i$ (that is, $E \exists i \to ->|\{f_{A1}Ai(p)\}-, \{f_{B1}Bi(p)\}|>Th_1i$), it is judged that any fault has occurred in either system in this region. The judging result is recorded in the normal or faulty information recorder 8 in each every block as normal or faulty information.

Thus, in the signal characteristic amount calculators 6-1, 6-2 and characteristic amount comparator 7, by utilizing a macroscopic characteristic amount hardly influenced by coding noise or the like, the magnitude of differential value of characteristic amounts between systems is used as the norm of fault detection. Therefore, when the encoder is inserted in two systems, generally, coding noise differs in two systems, and this noise difference cause a is problem in the fault detection by a simple comparison of signals between two system, but in this preferred embodiment, coding noise difference is not detected falsely as fault, and audio quality deterioration characteristic of transmission error involving faulty area can be detected accurately.

The configuration of stages behind characteristic amount difference calculators 9-1, 9-2 is explained. This configuration is intended to judge the faulty system, that is, to detect which one of systems A, B has a fault. If the characteristic amount in each system presents an evidently abnormal value, meanwhile, the faulty system can be judged by threshold comparators 14-1, 14-2, and silent and mute detector 15 described below.

The characteristic amount difference calculators 9-1, 9-2 receive the characteristic amounts extracted in the signal characteristic amount calculators 6-1, 6-2, and with referring to the normal or faulty information recorded in the normal or faulty information recorder 8, calculates the difference D of characteristic amounts between coinciding region and non-coinciding region of the characteristic values between system A and B, in each system.

A ∥D∥ comparator 10 compares the difference D of characteristic amount of system A and the difference D of characteristic amount of system B. A faulty system judging unit 11 judges the faulty system on the basis of result of comparison of the ∥D∥ comparator 10. A large difference D of characteristic amount means a large change of audio signal between coinciding region and non-coinciding region, and the possibility of occurrence of fault of a fault is high. Further, depending on the degree of difference, the level degree of significance or non-significance of the judgement is determined. Hence, the faulty system judging unit 11 judges comprehensively in consideration of the above.

Figure 4:
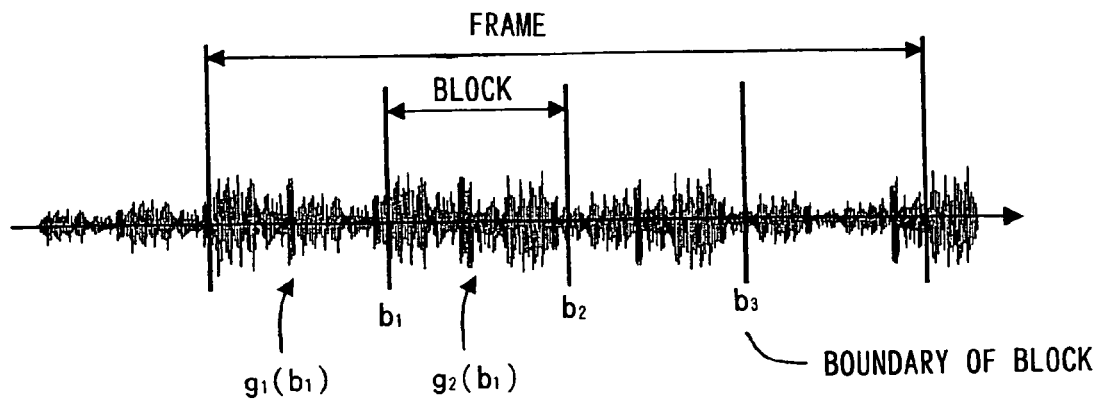
FIG. 4 is a waveform diagram for explaining the operation of faulty system judging unit.

FIG. 4 is a waveform diagram showing the operation of the faulty system judging unit 11. The faulty system is judged in a plurality of blocks of audio signals, for example, in a unit of four (hereinafter, this is called a frame). Referring to the normal or faulty information recorded in the normal or faulty information recorder 8, the difference $D=\{D_i i\}$ (i=1, 2, ... N) of characteristic amount between coinciding region and non-coinciding region of characteristic amounts between systems A and B is calculated in each system, and the system with of the greater value of D is judged as faulty system. The judging result is issued in every frame.

Thus, in the faulty system judging unit 11, by positively utilizing making use of the general property of localizing of faulty region in transmission fault (this tendency is particularly strong in digital transmission fault), in the event of a fault occurring in either system, and the site of fault is not known in the parallelly transmitted audio signals, the magnitude of difference of characteristic amount in normal region and characteristic amount in faulty region in each system is used as the norm, and the system of the greater difference is judged to be a faulty system. In this case, since the system having fault is judged by detecting only the difference of the characteristic amounts between normal region and faulty region, it is possible to determine stably without depending on the error rate of the system.

More specifically, first, in each characteristic amount, the differential absolute sum in the boundary area of normal and faulty regions is determined. Supposing the boundary of blocks in a frame to be $b_j j$ (j=1, 2, ..., n), the function to express the position of two blocks enclosing boundary $b_j j$ to be $g_1 1(b_j j), g_2 2(b_j j)$, and the total boundaries of normal/faulty regions to be C, within-system difference $D_{A1}Ai$ of i-th characteristic amount in system A is calculated in formula (2). Herein, n is the number of boundaries between blocks, and supposed to be 4 blocks per frame as shown in FIG. 4, the number of boundaries is 3. This is the same in system B.

$$D_{Ai} = \sum_{bj \in C} |f_{Ai}(g_1(b_j)) - f_{Ai}(g_2(b_j))| \quad (2)$$

On the basis of within-system difference $D_1 i$ of characteristic amount calculated in this manner, for example, ∥D∥ is calculated in formula (3), and the system with of the greater value of ∥D∥ is determined to be a faulty system.

$$\|D\| = \max\{w_i D_i\} \quad (3)$$

where $wW_i i$ (i=1, 2, ..., N) is the weighting coefficient of each characteristic amount i, which can be determined as follows. For example, by executing a preliminary experiment using a fault-free signal, distribution of differential values between the adjacent blocks is determined in each characteristic amount i, and the reciprocal number of the standard deviation is obtained as the weight wWi for the characteristic amount i.

Using the judging result of the faulty system judging unit 11 as a control signal, when it shows a fault in the working system, the switch 3 can be switched over to the standby system side. In this case, by optimizing the types and number of characteristic amounts, it is possible to switch to the standby system by raising the correctness rate of faulty system judgement, but misjudgment may occur even in this case.

In this preferred embodiment, accordingly, the judging result of each frame is collected plural times in a majority decision processor 12, and a final judgement is determined on the basis of the majority decision, and thereby the reliability of judgement is enhanced.

Further, by comprising a significance judging unit 13, the judging result to be used in majority decision in the majority decision processor 12 is limited only to the judging result determined to be significant in formula (4), so that the efficacy of majority decision processing can be further enhanced.

$$\frac{|(\|D_A\| - \|D_B\|)|}{\|D_A\| + \|D_B\|} > TH \rightarrow \text{JUDGMENT IS SIGNIFICANT} \quad (4)$$

By majority decision processing according to the significance determination in formula (4), the judging result if the difference of characteristic amount difference of system A and difference of characteristic amount difference of system B is small, the reliability of the judging result is judged to be small (not significant), and the result is not used in majority decision.

The preferred embodiment further comprises threshold comparators 14-1, 14-2 and silent and mute detector 15, and the characteristic amounts calculated by signal characteristic amount calculators 6-1, 6-2 and audio signals are checked against predetermined conditions, and the checking result is used in determination of faulty system or the level of significance.

When the characteristic amounts calculated by signal characteristic amount calculators 6-1, 6-2 are evidently abnormal values, it is judged that a fault has occurred in the system showing abnormal values. Evidently abnormal values occur in the event of audio signals of unusually high large level, or adversely continued zero level signals. The threshold comparators 14-1, 14-2 provided in systems A and B detect abnormal values of characteristic amounts of systems A and B. The silent and mute detector 15 detects if abnormality of audio signal level has occurred only in one system only or not. If the signal level of one system continues to be zero, it is highly possible that mute fault has occurred in the encoder or decoder in a preceding stage of this system.

The faulty system judging unit 11 judges that fault has occurred in the system if the characteristic value or the signal level of one system shows an abnormal value. When the characteristic value or signal level shows an abnormal value, the judging result of the faulty system judging unit 11 is regarded to have be a high in reliability, and the significance judging unit 13 elevates the level of significance at this time.

Figure 5:
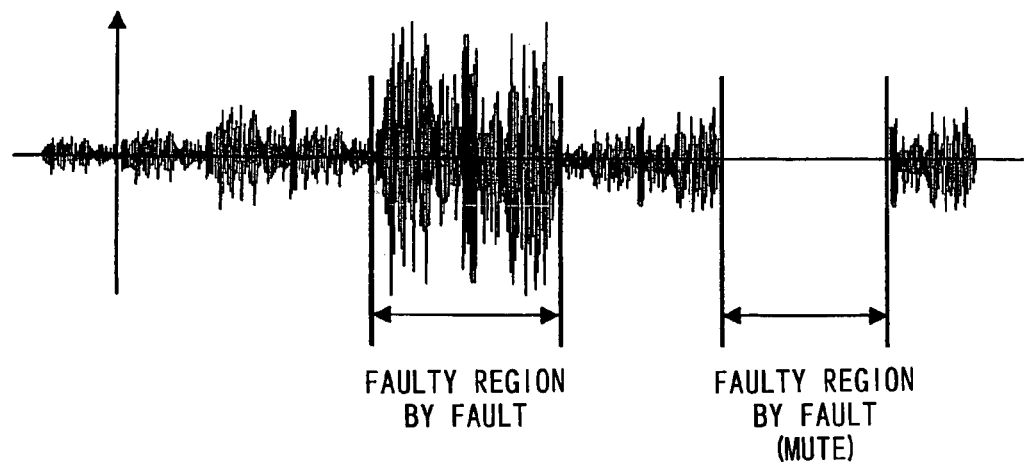
FIG. 5 is a waveform diagram showing an example of audio signal including a faulty region due to a fault.
Figure 6:
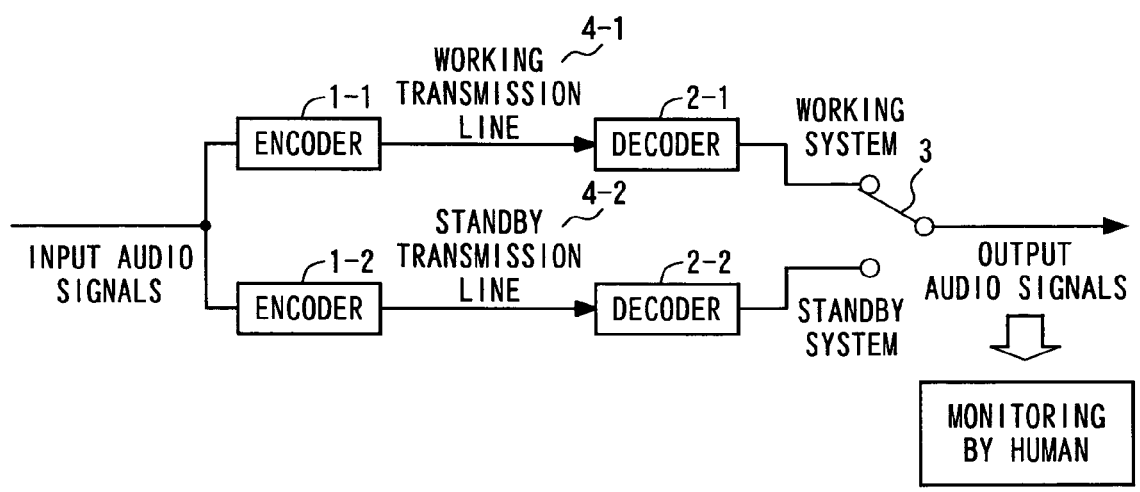
FIG. 6 is a block diagram of a conventional parallel transmission apparatus.

FIG. 5 is a waveform showing an example of audio signal including faulty region by fault. This diagram shows an audio signal waveform including a faulty region of extremely large signal level due to fault and a faulty region by mute fault. As mentioned earlier, the faulty region due to transmission fault is localized.

Mute fault is, for example, output of silent signal (zero level signal) as audio signal as a result of detection of transmission fault by encoder or decoder installed in a preceding stage of fault detection process. In such a case, if only one system is monitored, it cannot be distinguished whether the present audio signal is silent signal or has any it is due to mute fault.

In the preferred embodiment, the silent and mute detector 15 receives audio signals from both systems, and does not detect judge any fault if both systems are in silent state, and determines a mute fault when only one system is in silent state, and hence the reliability of fault detection is high.

In the preferred embodiment, since the encoders and decoders are installed in both systems, and the audio signals are transmitted by digital compression coding, but compression coding in transmission is not always necessary, and the invention can be also applied in the case of audio signal transmission of audio signals without compression.

Figure 7:
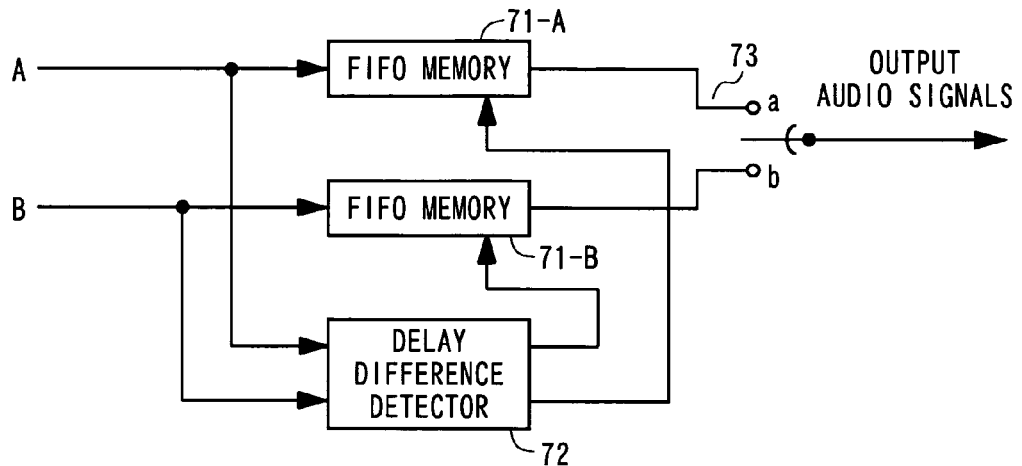
FIG. 7 is a block diagram showing a schematic configuration of apparatus of the invention for delay difference detection and adjustment for parallelly transmitted audio signals.

Next, the apparatus for delay difference detection and adjustment for parallelly transmitted audio signals is explained. FIG. 7 is a block diagram of configuration of apparatus for delay difference detection and adjustment for parallelly transmitted audio signals of the invention. Audio signals from channels of systems A and B are put respectively into FIFO memories 71-A, 71-B. At the same time, these audio signals are also put into a delay difference detector 72.

In usual operation, for example, while system A is used in reception, a switch 73 is switched to contact-a side, and the audio signal from system A is sent out as output audio signal by way of FIFO memory 71-A. This means that is, system A is the working system, and system B is a standby system, and the switch 73 corresponds to the switch 3 in FIG. 1. In the event of fault occurring in system A, the switch 73 is switched overconnected to contact-b side, and this time the audio signal of system B is sent out as output audio signal. This switching is done automatically same as in the publication in patent reference 1.

At the time of switching, in order to deliver the output audio signal without disruption, the delay difference detector 72 detects the delay difference (deviation) between audio signals of systems A and B, and controls the relative reading positions of FIFO memories 71-A, 71-B according to this delay difference, and thereby adjusts the delay.

Figure 8:
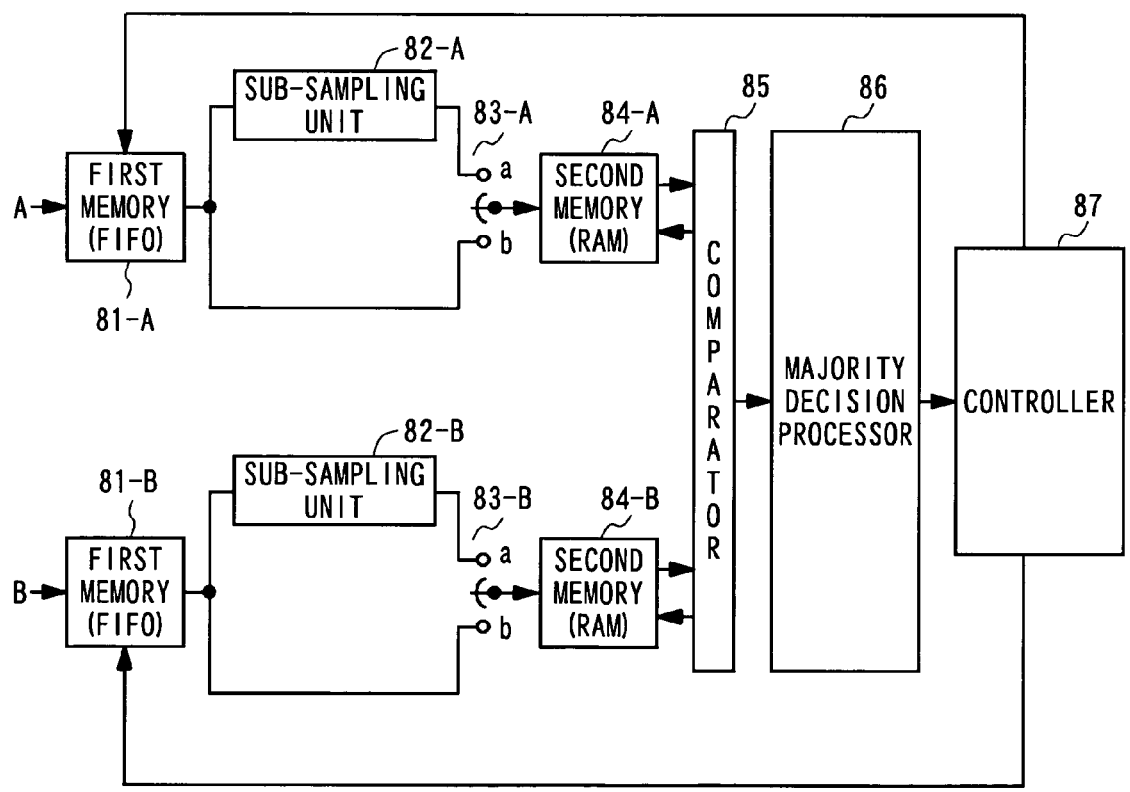
FIG. 8 is a block diagram of configuration example of delay difference detector.

FIG. 8 is a block diagram of configuration of delay difference detector 72. In the diagram, audio signals from channels of systems A and B are put into first memories (FIFO) 81-A, 81-B.

The first memories 81-A-, 81-B can change vary the delay amount of audio signals as their reading position is changed by FIFO controller 87 described below. The first memories 81-A-, 81-B have, for example, a memory capacity for 3 seconds each.

When the switches 83-A, 83-B are being switched to contact-a side, the audio signals being read out from the first memories 81-A-, 81-B are sub-sampled respectively in sub-sampling units 82-A, 82-B, and sub-sampled audio signals are put into second memories (RAM) 84-A, 84-B as audio data. When the switches 83-A, 83-B are being switched to contact-b side, the audio signals are directly put into second memories 84-A, 84-B as audio data.

A comparator 85 randomly accesses the second memories 84-A, 84-B, and reads out audio data from them. The comparator 85 also compares the read audio data while relatively changing the reading positions of the second memories 84-A, 84-B, and detects the difference of these audio data, and finds the reading position corresponding to the minimum difference. When the difference is minimum, the difference of reading positions corresponds to the delay difference between audio signals of systems A and B.

The detected delay difference is sent out to the FIFO controller 87 via a majority decision processor 866. The FIFO controller 87 changes the reading positions of the first memories 81-A, 81-B according to the input delay difference.

Next, the operation of the delay difference detector 72 is explained. Suppose the switches 83-A, 83-B are switched to the contact-a side. At this time, the audio signals of both systems A, B are put into first memories 81-A, 81-B, and the audio signals being read out from the first memories 81-A, 81-B are put into the second memories 84-A, 84-B as audio data.

The comparator 85 reads out audio data from the second memories 84-A, 84-0B, and detects the difference of these audio data. This detection is continued while relatively changing the reading positions of the second memories 84-A, 84-B, and the difference of reading positions corresponding to the minimum detected difference is obtained as the delay difference between audio signals of systems A and B. This delay difference is sent out to the FIFO controller 87 via the majority decision processor 86. The majority decision processor 86 is described later.

The FIFO controller 87 changes the reading positions of the first memories 81-A, 81-B according to the detected delay difference. The delay difference detected at this time is the result by sub-sampled audio data, and hence this delay difference is multiplied by the sub-sampling rate to convert into the number of samples before sub-sampling. For example, if the delay difference by 512 sub-samples (1 sub-sample for 512 samples) is 10 sub-samples, by calculating 5120 (=512× 10) samples, and the reading positions of the first memories 81-A, 81-B of systems A and B are changed. For example, if the result shows the audio data of system A is 5120 samples behind, the reading positions is delayed by 5120 samples from the first memory 81-B of system B.

Next, the switches 83-A, 83-B are switched to the contact-b side. The audio signals newly read out from the first memories 81-A, 81-B are directly read into the second memories 84-A, 84-B this time without being sub-sampled.

The FIFO memory 87, same as above, changes the reading positions of the first memories 81-A, 81-B according to the delay difference between audio signals of systems A and B detected by the comparator 85. In this case, some of the audio data put into entering the second memories 84-A, 84-B are supplied directly without passing through the sub-sampling units 82-A, 82-B, and the detected delay difference is directly applied in control of reading positions of the first memories 81-A, 81-B.

When the detected delay difference is zero, the difference of the reading positions of the first memories 81-A, 81-B is the delay difference between audio signals of systems A and B. According to this delay difference, the relative reading positions of the FIFO memories 71-A, 71-B in FIG. 7 are controlled, and the delay difference between audio signals of systems A and B is adjusted, which is not shown in the drawing.

Figure 9:
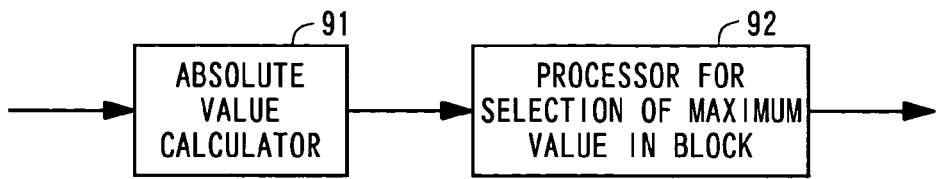
FIG. 9 is a block diagram of a configuration example of a sub-sampling unit.

FIG. 9 is a block diagram of configuration of sub-sampling unit 82 (82-A, 82-B). The sub-sampling unit 82 consists of an absolute value calculator 91, and a processor 92 for selection of maximum value in a block.

The absolute value calculator 91 determines the absolute value of sample values of audio signals entered successively. The processor 92 for selection of maximum value in a block selects and sends out the maximum value in each every 512 samples of the absolute value determined in the absolute value detector 91, supposing the sub-sample object blocks to be, for example, 512 samples.

In this way, first, the absolute value of sample values of audio signal in the sub-sample object block is determined, and the maximum of the value of absolute values in the sub-sample object block is determined, and obtained as the sub-sample value representing the block, and hence the sub-sample value sufficiently representing the waveform of the original audio signal can be obtained.

Figure 10:
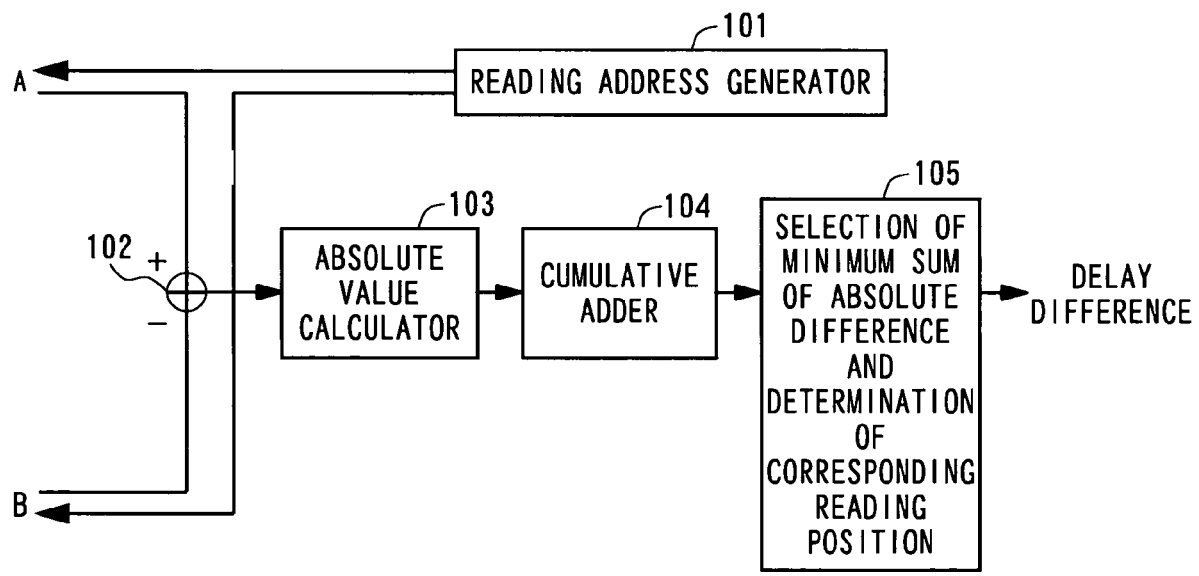
FIG. 10 is a block diagram of a configuration example of a comparator.

FIG. 10 is a block diagram of configuration of comparator 85. A reading address generator 101 relatively changes the reading positions of the second memories 84-A, 84-B (FIG. 8), and reads out audio data from them. A subtractor 102, an absolute value calculator 103, and a cumulative adder 104 read out, for example, 256 sub-samples each (or samples each) from the second memories 84-A, 84-B of systems A, B, and detects the differential absolute sum of these audio data.

A controller 105 processes this detection while relatively changing the reading positions of the second memories 84-A, 84-B, and determines the reading position when the of minimum differential absolute sum is obtained. The difference of reading positions is the delay difference of audio signals of systems A and B. This delay difference is transferred to the FIFO controller 87 in the a later stage.

Thus, the delay difference of audio signals between systems A and B is detected, but actually if the delay difference is once zero, the delay difference may drift (delay difference of small value such as 1 or 2 may be detected) due to difference in the coding noise superposed in on audio signals of systems A and B. That is, due to effects of coding noise different in each system, a slight drift may be included in each result of detection of delay difference.

This drift in delay difference is due to difference in coding noise superposed in on audio signals in two systems, generally, when audio signals of two systems are separately transmitted after compression being separately compressed at transmission side and decoded separately at reception side, and audio signals of two system are received.

The majority decision processor 86 processes the detected delay difference by majority decision to lessen the effect of such drift, and enables to detect and adjust the delay difference correctly. In the majority decision process, the largest-delay difference among plural detected delay difference values should be sent out.

As explained herein, according to the apparatus of the invention for delay difference detection and adjustment for parallelly transmitted audio signals, since the outputs of memories disposed in each the systems are compared mutually, it is easier to detect and adjust the delay difference (deviation) of these audio data by comparison of audio signals of two systems.

As in the preferred embodiment, by sub-sampling (thinning), converting the values, or processing by majority decision, detection and adjustment of delay difference by comparison of sample values of audio signals of two systems in parallel transmission can be executed correctly and easily even if the delay difference is large.

For example, in relay transmission of television signals by parallel circuits, when the one system is satellite communication and other system is optical submarine cable communication, the transmission delay difference of two systems may be is very large. Sometimes, the delay difference is as much as several seconds.

Digital audio signals are often sampled at 48 kHz, and a delay difference of, for example, 3 seconds is converted into sample number difference, it is as much as 48000×3=144000 samples. Supposing 1 sample to be 20 bits, it corresponds to 2880000 bits or about 3 Mbits.

To detect the delay difference between audio signals of two system, the audio signals are once stored in memories, and while changing the reading positions, it is required to find the reading position of the smallest difference between audio signals of two systems. However, if a random access memory corresponding to 3 Mbits is prepared, and if attempted to search all reading positions, the processing load is extremely heavy.

Accordingly, to save the memory capacity and lower the processing load, it is effective to sub-sample before putting into memories. That is, after obtaining an approximate delay difference in sub-sampled audio data, and it is effective that then the delay difference in the unit of one sample is detected again in a narrower searching range by audio data not sub-sampled. However, if the memory capacity is sufficient, the stage of delay difference detection by using sub-sampled audio data can be omitted.

Figure 11:
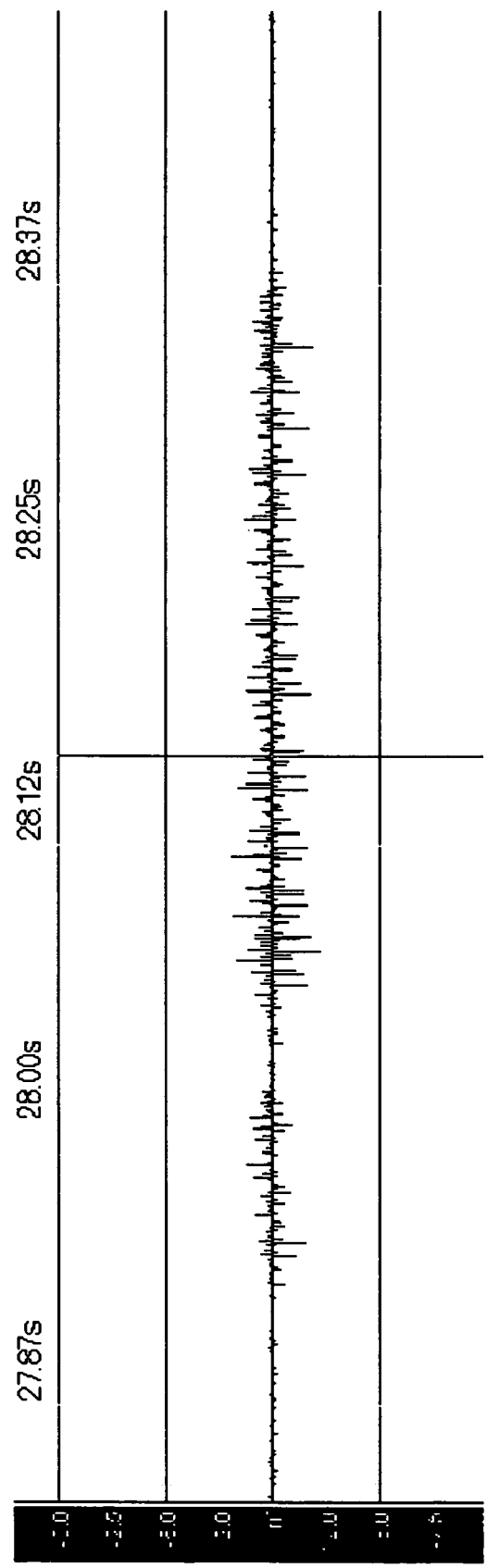
FIG. 11 is a waveform diagram showing the mode of vibration waveform of audio signal.

The audio signal, unlike video signal, is usually a pulsation signal frequently changing in plus and minus signs as shown in FIG. 11. Therefore, at the time of sub-sampling, if a sample is picked up at every specific number of samples, the signal after sub-sampling may not always represent the original waveform sufficiently.

To avoid such inconvenience, in the preferred embodiment, first the absolute values of signals in sub-sample object block are determined, and the maximum value in the block is obtained as the sub-sample value representing this block.

The apparatus of the invention for delay difference detection and adjustment for parallelly transmitted audio signals is not limited to this preferred embodiment alone, but may be changed and modified variously within the technical scope thereof. For example, the sub-sampling means may have square calculation and maximum selecting means, and the square of the data before sub-sampling is determined, and the maximum value in the sub-sample object block is determined, and sent out as sub-sample value.

The first memory is not always required, and the delay difference can be detected on the basis of the reading position of the second memory. By majority decision process of detected delay difference, the effect of drift of delay difference is lessened, and stable and accurate detection and adjustment of delay difference can be realized, but if the drift of detected delay difference is small, the majority decision process can be omitted.

As explained herein, according to the apparatus of the invention for fault detection for parallelly transmitted audio signals, the fault and faulty system can be detected automatically in real time, automatically, and at high reliability, by using parallelly transmitted audio signals, which contributes to non-interruption of parallel transmission of audio signals, that is, enhancement of reliability.

According to the apparatus of the invention for delay difference detection and adjustment for parallelly transmitted audio signals, the delay difference (deviation) of two systems can be detected and adjusted easily, stably, and correctly by comparison of audio signals of two systems.

What is claimed is:

1. An apparatus for delay difference detection and adjustment for parallelly transmitted audio signals, being an apparatus for delay difference detection and adjustment between same audio signals transmitted in circuits of two systems, comprising:
   a memory provided in each system for receiving audio data from each system,
   comparing means for mutually comparing outputs of the memories,
   control means for controlling the reading position of the memory depending on the output of the comparing means,
   detecting means for detecting the delay difference between audio signals of two system on the basis of the comparison result of the comparing means and the reading position of the memory, and
   adjusting means for adjusting the delay difference between audio signals of two system according to the delay difference.

2. The apparatus for delay difference detection and adjustment for parallelly transmitted audio signals of claim 1, wherein the sample values of audio signals are input the memory as audio data, and the comparing means determines the difference of sample values.

3. The apparatus for delay difference detection and adjustment for parallelly transmitted audio signals of claim 1, wherein sub-sampling means is provided before the memory, and the sub-sample values sent out from the sub-sampling means are input the memory as audio data.

4. The apparatus for delay difference detection and adjustment for parallelly transmitted audio signals of claim 1, wherein a route for direct input of audio data and a route for input as sub-sampled are provided at the input side of the memory, and the delay difference between audio signals of two systems is detected in two steps, these are that is a step of input of sub-sampled audio data into the memory and a successive step of input of direct data into the memory.

5. The apparatus for delay difference detection and adjustment for parallelly transmitted audio signals of claim 3, wherein the sub-sampling means has absolute calculating and maximum selecting means, and determines the absolute value of data before sub-sampling, and further determines the maximum value in the sub-sample object block and sends our as sub-sample value.

6. The apparatus for delay difference detection and adjustment for parallelly transmitted audio signals of claim 3, wherein the sub-sampling means has square calculating and maximum selecting means, and determines the square value of data before sub-sampling, and further determines the maximum value in the sub-sampled object block and sends out as the sub-sample value.

7. The apparatus for a delay difference detection and adjustment for parallelly transmitted audio signals of claim 1, wherein the detecting means detects the delay difference for minimizing the difference of audio data of two systems, and the control means-determines the majority decision of plural times of delay difference detected by the detecting means, and controls the reading position of the memory according to the result.

* * * * *